(12) United States Patent
Maleitzke

(10) Patent No.: US 11,945,445 B1
(45) Date of Patent: Apr. 2, 2024

(54) ENVIRONMENTALLY FRIENDLY SMART MODES FOR VEHICLES

(71) Applicant: Mercedes-Benz Group AG, Stuttgart (DE)

(72) Inventor: Mark Maleitzke, Bainbridge Island, WA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/193,411

(22) Filed: Mar. 30, 2023

(51) Int. Cl.
  *B60W 30/182* (2020.01)
  *B60W 40/02* (2006.01)
  *B60W 50/14* (2020.01)

(52) U.S. Cl.
  CPC .......... *B60W 30/182* (2013.01); *B60W 40/02* (2013.01); *B60W 50/14* (2013.01); *B60W 2555/00* (2020.02)

(58) Field of Classification Search
  None
  See application file for complete search history.

(56) References Cited

U.S. PATENT DOCUMENTS

| | | | | |
|---|---|---|---|---|
| 11,326,529 | B1 * | 5/2022 | Dudar | B60W 30/182 |
| 11,643,098 | B1 * | 5/2023 | Bolzoni | B60W 50/045 |
| | | | | 701/32.3 |
| 2006/0244576 | A1 * | 11/2006 | Sugie | B60R 25/1004 |
| | | | | 340/429 |
| 2010/0211247 | A1 * | 8/2010 | Sherony | B60W 40/076 |
| | | | | 701/1 |
| 2013/0275023 | A1 * | 10/2013 | Gregg | F02D 41/10 |
| | | | | 701/102 |
| 2018/0022182 | A1 * | 1/2018 | Miller | B60H 1/00778 |
| | | | | 165/203 |
| 2018/0334165 | A1 * | 11/2018 | Schneider | B60W 10/18 |
| 2018/0339703 | A1 * | 11/2018 | Nix | B60W 10/04 |
| 2020/0156436 | A1 * | 5/2020 | Urano | G06V 40/103 |
| 2020/0317216 | A1 * | 10/2020 | Konrardy | B60W 30/182 |
| 2020/0398693 | A1 * | 12/2020 | Haraguchi | H02J 13/00006 |
| 2022/0058329 | A1 * | 2/2022 | Ricci | G06F 30/398 |
| 2022/0105793 | A1 * | 4/2022 | Sukhatankar | B60K 25/06 |

OTHER PUBLICATIONS

Gaines, "Ask a scientist: When is it more efficient to turn off my car instead of idling?", Apr. 2017, Argonne National Laboratory, https://www.anl.gov/article/ask-a-scientist-when-is-it-more-efficient-to-turn-off-my-car-instead-of-idling (Year: 2017).*

* cited by examiner

*Primary Examiner* — David P. Merlino
(74) *Attorney, Agent, or Firm* — Dority & Manning, P.A.

(57) ABSTRACT

Methods, computer-readable storage media including computer instructions, and systems for reducing power consumption or greenhouse gas emissions. In some examples, a method includes determining a context of a vehicle, selecting a particular smart mode from among multiple smart modes that are associated with the vehicle, the particular smart mode being associated with deactivation or moderation of one or more vehicle components that draw battery power or that contribute to greenhouse gas emissions, and transmitting a message to deactivate or moderate the one or more vehicle components of the vehicle according to the selected, particular smart mode.

20 Claims, 6 Drawing Sheets

ENVIRONMENTALLY FRIENDLY SMART MODES FOR VEHICLES

BACKGROUND

According to the U.S. Department of Energy, heavy- and light-duty vehicles waste six billion gallons of fuel each year through idling. Half of those vehicles are private vehicles which, by idling, add about 30 million tons of carbon dioxide to the atmosphere each year. Some have estimated that eliminating vehicle idling would have the equivalent effect as taking several million vehicles off the road.

SUMMARY

When a driver is parked and waiting in a vehicle, they are typically presented with the options of waiting with the with the vehicle fully on, with the engine off, or in an "accessory" mode. With the engine on, functionality of the vehicle is available for the comfort of the driver, but the engine and vehicle systems are running at increased capacity or accessibility, which can create pollution and waste energy. When the engine is off, there are few or no features available for the comfort of the driver. Placing the vehicle into an "accessory" MODE can enable some comfort features that do not require use of the engine, but other comfort features that are associated with an operating engine are disabled, such as air conditioning.

In contrast to these limited options, this specification describes configurable, smart modes for a parked vehicle that can improve the safety of the vehicle and comfort of the driver, and can reduce pollution and energy waste while a driver or other vehicle occupant is operating a vehicle. In some examples, the smart modes can be used when the vehicle occupant is waiting in a parked vehicle while not on an operating roadway. A smart mode may be automatically enabled by a vehicle, e.g., upon parking at a particular destination or type of destination, or may involve the activation, deactivation and/or moderation of multiple vehicle settings that are associated with the smart mode. Further, activation or deactivation of a smart mode may involve a sequence of manual or automated actions that occur in coordination with driver actions, e.g. in coordination with the setting or release of a parking break. Such a feature may eliminate the need for a driver to manually change several settings, and may optionally enable certain settings that are not manually selectable by a driver while the car is in motion.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

Various implementations include methods, computer-readable storage media including computer instructions, and systems for reducing power consumption or greenhouse gas emissions. In some examples, a process includes determining a context of a vehicle, selecting a particular smart mode from among multiple smart modes that are associated with the vehicle, the particular smart mode being associated with deactivation or moderation of one or more vehicle components that draw battery power or that contribute to greenhouse gas emissions, and transmitting a message to deactivate or moderate the one or more vehicle components of the vehicle according to the selected, particular smart mode.

In other examples, transmitting a message to moderate the one or more vehicle components may include transmitting a message to the one or more vehicle components to remain activated but to operate at a lower setting that reduces drawn battery power or greenhouse gas emissions. Determining the context to the vehicle may include determining that the vehicle is currently transiting on a ferry. Selecting the particular smart mode may include selecting a ferry mode. Transmitting the message may include transmitting the message to automatically apply a parking brake, turn off passenger compartment lights, and disable a vehicle tow away alarm.

In other examples, the process includes determining an updated context of the vehicle, selecting a different smart mode from among the multiple smart modes that are associated with the vehicle, prompting an occupant of the vehicle to confirm a change of smart driving modes, and, after the occupant of the vehicle confirms the change of smart driving modes, transmitting a message to deactivate or moderate the one or more vehicle components of the vehicle according to the different smart mode. The process may include ranking the multiple smart modes according to respective scores for each smart mode that are generated based on the context of the vehicle, where the particular smart mode may be selected as a highest ranked of the multiple smart modes. The one or more vehicle components may be deactivated or moderated according to one or more user configurable settings that are associated with the particular smart mode. The particular smart mode may be a smart mode that was previously created for the context of the vehicle by a prior occupant of the vehicle.

In another example, a process includes determining a context of a parked vehicle, comparing the context to a plurality of predetermined contexts, determining whether the comparison exceeds a threshold value, and in response to determining whether the comparison exceeds a threshold value, prompting a user for one or more possible actions.

In another example, a process includes receiving a current context, receiving an indication of a parked vehicle, in response to receiving the current context and the indication of the parked vehicle, prompting a user for one or more possible actions, receiving from the user input, and, in response to receiving the input, causing one or more actions to occur.

The details of one or more implementations of the present disclosure are set forth in the accompanying drawings and the description below. Other features and advantages of the present disclosure will be apparent from the description, drawings, and claims.

DETAILED DESCRIPTION

Figure 1:
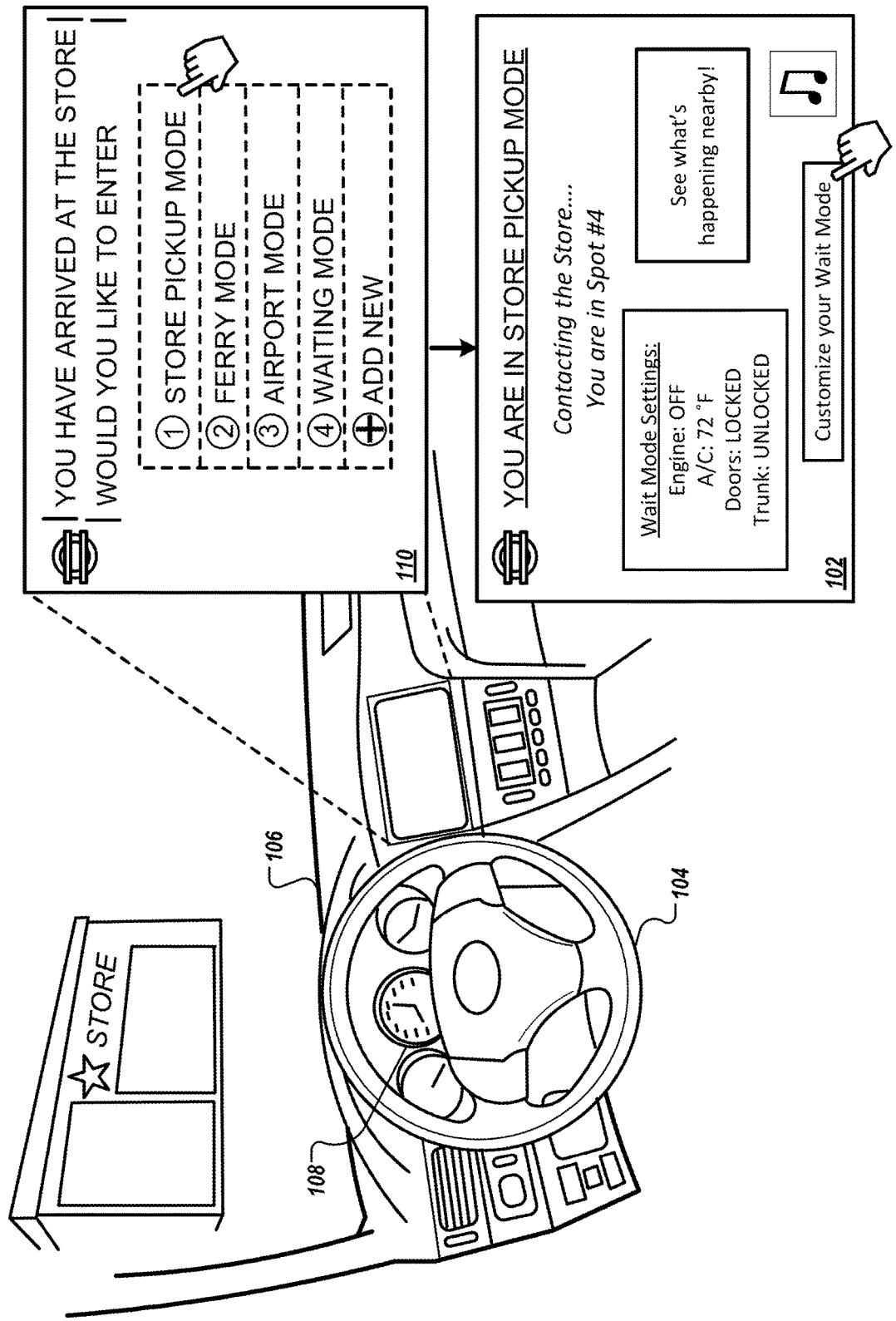
FIGS. 1 and 2 illustrate example smart mode features, displays, and functionality according to an embodiment hereof.
Figure 2:
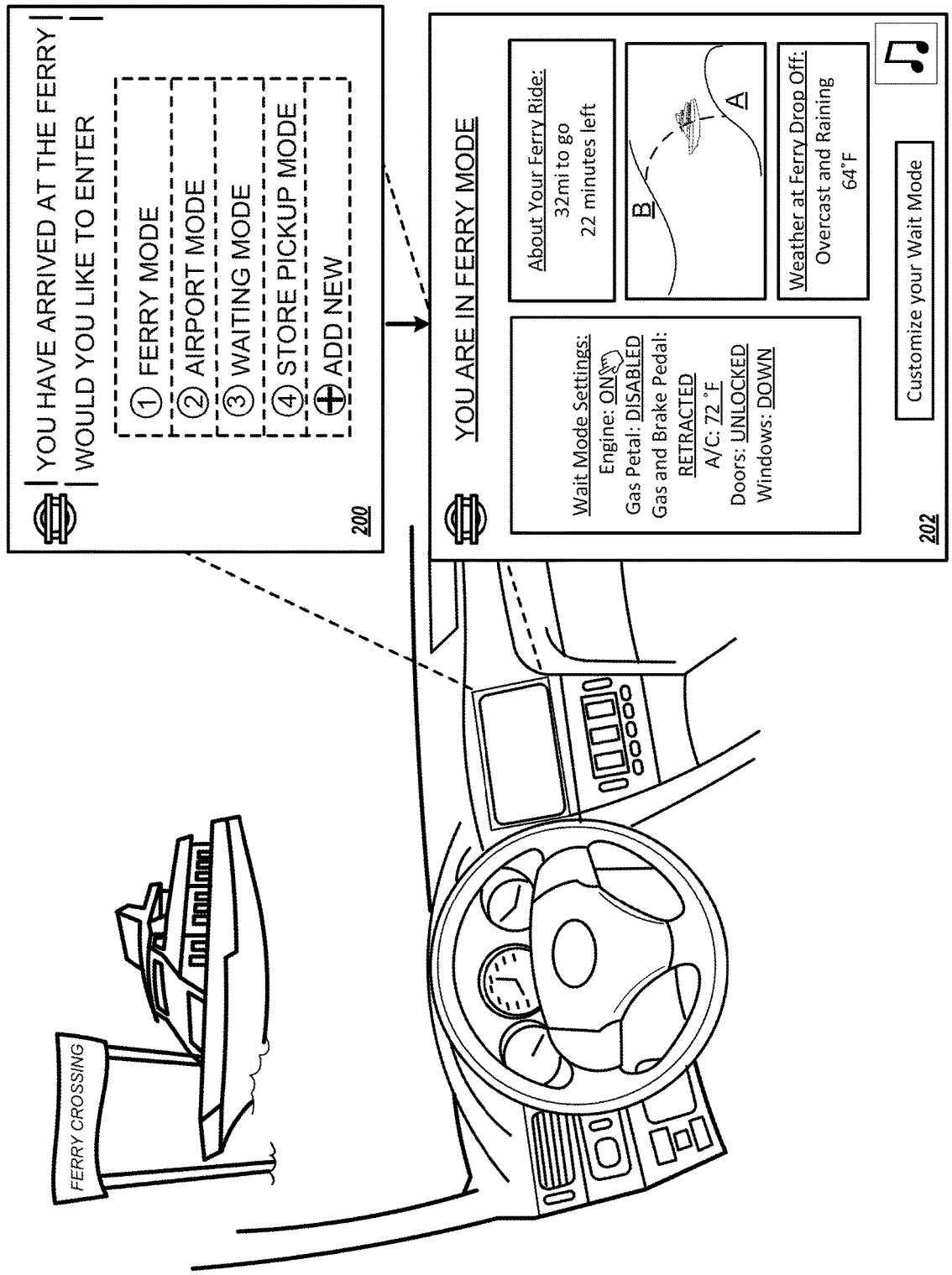

FIGS. 1 and 2 depict example smart mode features, displays, and functionality. In general a smart mode can be used in any scenario that a driver is safely operating their vehicle, such as when a driver is remaining in a vehicle while safely parked and while the vehicle is not operating on an active roadway.

In some examples, different smart modes can be associated with a vehicle that is safely parking in a carpool line or waiting for children to finish a lesson or practice, transiting over a body of water on a ferry or other conveyance, waiting for a curbside pickup from a store or restaurant, taking a nap while a vehicle is safely parked, or meditating or trying to get some work done in a parking lot while the vehicle not moving. In other examples, the smart modes can be associated with circumstances when a driver is safely operating their vehicle on a roadway.

Each of these scenarios can be associated with a particular location or a particular type of location and can have a respective smart mode that the driver can enter, e.g., automatically by the driver saying the appropriate command phrase or selecting the appropriate control from a screen. Vehicle smart modes can prepare the vehicle for that particular type of environmentally friendly operation at the respective location. For example, after parking at a store for curbside pickup a smart mode can be dynamically selected and the engine can shut off, the radio can lower the volume, the driver's side window can roll down, and the trunk can unlock or open, thereby cooling the vehicle using the outside air and reducing generated emissions or power consumption associated with operating a vehicle air conditioning system.

In some examples, a driver can configure their own smart mode. For instance, a driver may enjoy reminiscing in their vehicle by opening all of their vehicle's windows and listening to a particular song while parked near a favorite overlook. In this case, the driver may configure their own smart mode for that spot or scenario, or select a smart mode that other drivers have already configured and shared for that spot or scenario. Drivers can also configure smart modes based on their own power consumption or greenhouse gas emission goals, e.g., to configure a vehicle to operate fewer vehicle systems and thereby reduce power consumption or carbon footprint when the vehicle is in operating or parked in different contexts, according to the driver's own environmental goals.

In these scenarios, a smart mode can reduce the pollution or emissions of an internal combustion engine, and help reduce the effects of climate change by shutting off cylinders, shifting to hybrid or "eco" mode, shutting off the engine entirely, activating a primary or auxiliary battery powered mode, or any combination thereof. Despite the reduced reliance on the engine, a smart mode may maintain many or all the features of the vehicle that are available to the driver, or activate additional features that are not typically available driver. A smart mode can be preconfigured to a situation to maintain the features that add comfort to the driver and to reduce the number of vehicle features that are not necessary while parked. In battery electric vehicles (BEVs), enabling a smart mode reduce battery consumption which has the additional advantages of extending the vehicle range and charge.

A smart mode may address the safety needs of the vehicle occupants, and may allow a user to customize a vehicle according to their personal environmental outlook or goals. For instance, when a vehicle is parked while a driver is waiting for a passenger to arrive, an internal combustion engine is typically shut off, however, this disables the air conditioning for the other passengers, and can also unlock all the doors. With a smart mode that is associated with driver waiting, the engine can be shut off, however the air conditioning may be configured to remain on, and the vehicle doors can be set to lock or unlock according to driver preferences. In another example, a smart mode associated with a vehicle transiting on a ferry may automatically apply a parking brake, turn off passenger compartment lights, disable a vehicle tow away alarm, and still make a radio and seat belts available to vehicle occupants.

Smart modes can improve the comfort of the drive. For example, when arriving at the carpool line for school pickup, a smart mode can reduce emissions, set the air conditioning low, slide the seat back and retract the steering wheel. This functionality creates a relaxing environment for the driver to wait while reducing the impact to the environment. With each smart mode, the driver does not individually move the seat, retract the steering wheel, or change the air conditioning settings, neither does the driver have to restore each setting afterwards. When leaving a smart mode, each setting is restored to the original driving conditions of the vehicle.

A smart mode can reduce pollution, emissions, and greenhouse gasses within the environment. Safety can improve by controlling locked doors, monitoring toxic gas build up, preventing certain features while in a waiting mode, or any combination thereof. Driver comfort is achieved through enabling desired features of the vehicle, regardless of whether the vehicle's engine is operating.

In FIG. 1, a vehicle cabin includes components such as a steering wheel 104, dashboard 106, and gauge cluster 108. A display screen 110 is depicted in the center of the dashboard. The dashboard screen displays selections of different smart modes 100 and shows an example of options available for selection on a smart mode user interface 102. In other examples, smart mode user interface 102 is displayed elsewhere, such as on a mobile device of a vehicle occupant, on a display that is external to the vehicle and that may or may not be controlled by a third party, or on a heads-up display.

When a vehicle arrives at a location, the vehicle can suggest to the driver several smart modes. A smart mode adjusts one or more vehicle settings in order to establish one or more conditions of the vehicle in a non-driving condition. The smart mode can change settings of the vehicle that can improve driver comfort, can reduce pollution, can improve driver safety, or any combination thereof.

In FIG. 1, a driver has arrived at a store and is parked in a spot reserved for "curbside pickup." Unlike a vehicle that idles the engine while waiting in a parking space and emits greenhouse gasses, this vehicle implements a smart mode that can reduce the environmental impact of the vehicle and can maintain one or more features that contribute to the comfort of vehicle occupants. A smart mode can, among other things, maintain the air conditioning running and adjust the engine settings to improve efficiency and reduce pollution. For instance, a vehicle can shut off cylinders within the engine or shut off the engine entirely when not needed.

The driver can select a smart mode from the list of suggestions displayed on the user interface. The input from the driver can, for example, be provided through steering wheel inputs, mobile device inputs, spoken inputs, inferred inputs, or vehicle console inputs. The driver can choose the suggested smart mode, alternate smart modes, or choose to create a new smart mode. For example, when the driver arrives at the store, the vehicle can suggest a "store pickup" smart mode, with subsequent choices available such as "ferry," "airport", or more.

Once selected, a smart mode can change the settings of the vehicle. The smart mode user interface 102 indicates the settings that are altered. The smart mode can affect the settings in accordance with the selected smart mode. For instance, when the driver chooses "store pickup" mode, the engine can shut off, the air conditioning can be set to a predetermined temperature, the doors can be locked, and the trunk can be unlocked. A smart mode can control one or more features of the vehicle including: the engine status, air conditioning settings, music, radio, windows, locks, seat positions, steering wheel position, suspension, lights, air conditioned or heated seats, cellular functions, navigation systems, safety systems, vehicle alarms, software modules, windshield wipers, window defrosters, automated shutdown timeouts, other entertainment or comfort features, or any combination thereof.

The vehicle can suggest a smart mode to the driver based on location, but a driver can enter a smart mode manually if desired. For instance, when parked at the store, the vehicle can suggest a "curbside pickup" smart mode, however, the driver can manually select a "mobile office" smart mode instead. This alternate selection can still promote the comfort of the driver, but does not attempt to contact the store for a curbside delivery, or unlock the trunk. In this way, the smart mode can promote the reduction of pollution and can improve the safety or comfort of the driver or passengers.

In some implementations, the vehicle can use location sensors to determine the location of the vehicle. These location sensors can be Global Positioning System (GPS), cellular positioning systems, WiFi, Bluetooth, cameras, sensors or emitters at a physical location, or any combination thereof. The vehicle can also receive data from a connected mobile device to determine location or desired location from a navigation application. The location sensors determine the approach of the vehicle to the location or the arrival of a vehicle to a location. For example, the vehicle can determine through the driver's navigation system that the location is a particular store. The vehicle can then determine the approach to this location through the navigation system and the vehicle sensors. The vehicle then determines the arrival of the vehicle as the vehicle is placed into park in a parking spot.

In some implementations a vehicle can use a location sensor input to determine the likelihood of a location desirable of a smart mode. The system can determine a recommendation from a list of locations identified as common areas to use a smart mode. This list can be user defined, established through historical data, default settings, periodic updates, community gathered data, or any combination thereof. For instance, a driver can approach a store at the same time every week for a grocery pickup. The vehicle can use historical data of the driver parking and entering a smart mode to then suggest a smart mode when the vehicle enters park.

In some implementations, a smart mode suggestion can use community data, for example, the driver can park in a gas station of which there is no historical data. However, the community data can suggest that it is likely that the driver will desire to enter a smart mode and can suggest a smart mode to the driver. Driver or community preference can influence the suggested smart mode.

Probabilistic functions, machine learning (ML), artificial intelligence (AI), condition tables, lookup tables, or any combination thereof can calculate the likelihood of a location desirable of a smart mode. AI may also be used to determine the type of location by processing visual sensor data or other data, for example to determine that the vehicle is at a gas station by visually recognizing a gas pump or a sign indicating fuel prices nearby the vehicle. A driver or other conditions can assign a particular location to a smart mode.

The vehicle can take into account factors other than location for determining whether a smart mode is desirable. Factors contributing to determine desirability of a smart mode can include, driver profiles, time of day, vehicle being driven, vehicle conditions, vehicle sensors, or any combination thereof. For example, a driver can approach a location where a typical smart mode might include rolling down the windows, however, the vehicle senses that it is raining. Therefore, the vehicle takes into account the weather and can suggest an alternate smart mode or can suggest an alteration to the preferred smart mode.

A smart mode can utilize driver mobile devices or cellular technology in the vehicle in order to facilitate location interactions. For example, the driver can park at a store and the smart mode can use the driver's mobile device to contact the store, report the parking spot position, and request delivery of goods to the corresponding parking spot. The vehicle can also unlock or open the trunk in preparation for the delivery of the goods.

The vehicle can control functions of the car continuously in order to facilitate location interactions. For instance, while in a smart mode, the vehicle can use sensors to detect an approaching emergency services vehicle and lower the volume of music, restart the engine, and alert the driver to the approaching emergencies services vehicle. The smart mode is able to alert the driver in order to give the driver time to safely make space for the emergency services vehicles to pass.

The driver can alter or change the smart mode while the vehicle is currently in a smart mode. For instance, the driver can select to customize the smart mode and change settings such as air conditioning, radio settings, which doors are locked or unlocked, or any combination thereof. Through the user interface, the driver can alter the current mode, change the smart mode to another mode, or create a new mode.

A smart mode can suggest forms of entertainment to the driver while in the smart mode. The inputs to the suggestions can be influenced by location settings, local events, driver preference, waiting time, vehicle sensors, driver information, or any combination thereof. For instance, the vehicle can determine that the waiting time will exceed 20 minutes and suggest to the driver to return a missed phone call from earlier.

In an effort to prevent unnecessary pollution, the smart mode can calculate the battery, fuel, or energy source remaining or available in the smart mode. The smart mode can suggest alterations to settings of the smart mode that can improve comfort and can reduce pollution. In a given smart mode, the vehicle can display the time remaining for a given smart mode based on the energy source remaining.

Based on the energy source remaining in the vehicle, a smart mode can make suggestions. For example, a vehicle approaching a shopping center can suggest a parking location that contains a charging plug for the electric vehicle and can suggest parking there based on current battery levels. A vehicle can recommend that a fuel stop be the next location for gas vehicles, and can suggest a close location that is selectable in a navigation system. Each scenario can predict the waiting period usage. For instance, a vehicle can calculate that the expected waiting time during a curbside pickup and can suggest refueling before the pickup.

FIG. 2 is an example of the waiting system features, display, and functionality. When the vehicle arrives at a different location, the suggestions can change based on the location data, sensor data, or more. For instance, a driver approaching a ferry station can be suggested a "Ferry" mode 200.

A smart mode can interact with the location to provide useful information to the driver. For example, the driver can park at a golf course and be informed of a tournament occurring that weekend. The driver can park at a store and be informed of a special sale occurring inside. The driver can park at a ferry and be informed of the ferry schedule.

A smart mode can take into account information obtained from external sources in order to provide pertinent information to the driver. For example, when parking on a ferry, the vehicle can access the ferry schedule and track the location of the vehicle as it transits on the ferry. A display can track the current location as the ferry transits and the time or distance to go until the trip is complete 202. The vehicle can also display the expected weather upon arrival 202. The vehicle can display the returning ferry information or save it to the vehicle to remind the driver at a later time.

The vehicle can detect the difference between locations and activities and can suggest the appropriate smart mode. For instance, when a vehicle approaches a ferry stop, the vehicle can tell the difference between being parked and waiting for the ferry to arrive and being parked on the ferry for transport. The vehicle can suggest two different smart modes in this scenario. A first smart mode to wait for the ferry to arrive and a second smart mode for being transported by the ferry.

In some implementations, a driver can use a smart mode to prepare for a future scenario. For example, a driver can set a smart mode to focus on charging the battery while waiting for the ferry. Because the engine may not be allowed to run while being transported on the ferry, the first smart mode that is waiting for the ferry to arrive while preparing the vehicle for a second smart mode that can use the battery and can improve battery life while riding on the ferry.

Smart modes can shift as circumstances change, e.g. as objects or people surrounding the vehicle change, as the vehicle changes locations, or as time elapses. As things change, a driver can manually select new modes that are freshly recommended to them, or the vehicle may select a most appropriate smart mode automatically to fit the new circumstances. For safety reasons, a user may be prompted to approve a change in smart mode before one is activated or deactivated.

The vehicle can utilize external information to predict the future conditions of the vehicle. For instance, a vehicle can determine the time until a ferry arrives and calculate how much battery will be able to be charged in that amount of time. The vehicle can also prioritize running the engine while still in transit to the ferry location. The vehicle can predict from historical data and destination information, that the vehicle will require use of the battery while riding the ferry and prioritize full use of the engine or deactivation of a hybrid mode while driving to the ferry station in order to ensure the battery is charged upon arrival.

For an electric vehicle, battery or energy calculations can take into account the location of charging points and either can suggest a location to charge prior to or after the ferry ride. During the ferry ride the smart mode can conserve the appropriate amount of energy necessary to get the vehicle from the ferry to the charging port, thus ensuring that the battery is not over depleted during transit on the ferry. While waiting at a charging station getting a charge, a charging smart mode could be activated by pulling into the station or by plugging in the vehicle to begin charging, where the decision to activate the mode could occur automatically based on the car's internal sensors to inferring whether the vehicle is occupied or vacant while charging.

A smart mode can alter behaviors of a vehicle during longer periods of waiting. For instance, the driver may want to leave the air conditioning or radio on with the engine off. On some vehicles, the radio may shut off when the vehicle doors are opened, however, a smart mode can leave the radio and air conditioning on after the door is opened.

A smart mode can be used in longer waiting periods in which the driver can depart the vehicle. For example, while transiting on a ferry, a driver can leave the vehicle in smart mode while walking about the ferry. The vehicle can maintain the heated seats, keep the windows defrosted, prevent unauthorized access, and more. A driver delivering food can set the vehicle in a smart mode that maintains the air conditioning running without the engine while delivering the food to the door.

A smart mode can restrict certain functions of the vehicle in order to prevent unsafe operation. For instance, when on a long ferry ride, the engine can stay enabled, but the gas pedal can be disabled to prevent inadvertent acceleration. A smart mode can restrict the use of the engine in a low ventilation area such as underground parking to prevent the build-up of toxic gasses. A vehicle can monitor the interior temperature and alternate the use of the engine to maintain a safe interior temperature.

Features of a smart mode can be changed while in the smart mode. For instance, the driver can change the seat position and steering wheel position through a physical or virtual control, such as a dashboard button or a user interface widget. The change to the smart mode can be done without exiting the smart mode. For example, the driver can ride the ferry and decide to use a laptop. By selecting to change the seat and steering wheel position to "laptop" the steering wheel will can retract and the seat position move back in order to facilitate room for the driver to open a laptop. When settings are changed while the vehicle is in a defined smart mode, the driver may be prompted whether or not to save some or all of those changed setting in associated with that defined smart mode or a new smart mode for use in the future.

Figure 3:
FIG. 3 illustrates an example user interface for configuring smart modes according to an embodiment hereof.

FIG. 3. is an example of a user interface for creating smart modes. A driver can create a mode, edit an existing, mode, download a mode, or any combination thereof. The driver can perform edits to a current mode or any other mode that may not be in use.

Several factors can contribute to the available controls within a smart mode including, engine status, air conditioning, steering wheel position, seat position, lights, door locks, trunk, windows, radio, seat heaters, air-conditioned seats, suspension, hybrid systems, windshield wipers, defrosters, exterior lights, steering wheel heater, displays, cellular functions, safety features, location data, navigation data, schedules, or any combination thereof 300.

A driver can create and label a particular smart mode. For example, a user can create a "No Emissions" smart mode that prioritizes the reduction of pollution during waiting periods. The reduction of pollution can be through use of hybrid systems or only turning the engine on when necessary. The vehicle can suggest a temperature range that increases efficiency of the engine and can reduce pollution. The vehicle can suggest other features that can reduce power consumption and can improve battery life. For instance, a "No Emissions" smart mode can suggest the engine remain off, the lights are off, the windows are open, and the fans are on.

The vehicle can suggest different settings based off of sensor data. For instance, the vehicle can suggest "No Emissions" smart mode but with the windows up if the temperatures outside are too cold. The vehicle can suggest using the engine 10% of the time to maintain heat within the cabin and can reduce the creation of pollution.

A smart mode can utilize other various modifications to the vehicle settings that can improve energy efficiency and can reduce pollution. Modifications to the vehicle settings include deactivating cylinders, deactivating auxiliary loads, altering engine performance tuning, or more. For example, the smart mode can use sensors to monitor exterior temperatures and calculate that the engine will need to be run for 2 minutes and shut off for 8 minutes. However, if the driver has prioritized lower emissions, the smart mode can calculate that, by altering the temperature in the cabin and shutting off the headlights, the engine will need to be run for 1 minute and shut off for 9 minutes. The calculation to improve efficiency is completed without active input from the driver.

One or more sensors can input to the decision making of the smart mode. Sensors that can be used for the selection of smart modes include vehicle sensors, particularly one or more, clocks, motion sensors, internal cameras, seat occupancy sensors, light sensors, accelerometers, compasses, temperature sensors, emission sensors, engine sensors, cameras, motion sensors, LIDAR, RADAR, ultrasonic sensors, or more. For instance, a vehicle can monitor the approach of the vehicle to the desired location and can suggest a parking spot that is energy efficient.

The vehicle can use real time senor data, historical data, or a combination to determine a covered parking spot at the airport. The covered parking location can be chosen from a plurality of lots around the airport. The decision to suggest a covered parking location can be influence by driver preferences, settings, time of day, flight information, vehicle information, or any combination thereof. The vehicle calculates the efficiency difference between parking in the shade versus parking in direct sunlight and running the air conditioner. A smart mode could also turn on seat heaters only for those seats that are occupied, or to turn on all seat heaters regardless of whether they are occupied.

For longer periods of waiting, a smart mode can suggest forms of entertainment that cannot be accessed while driving. For example, a driver can enter a smart mode while at the airport that enables entertainment through the vehicle screens such as movies, games, or videos.

Figure 4:
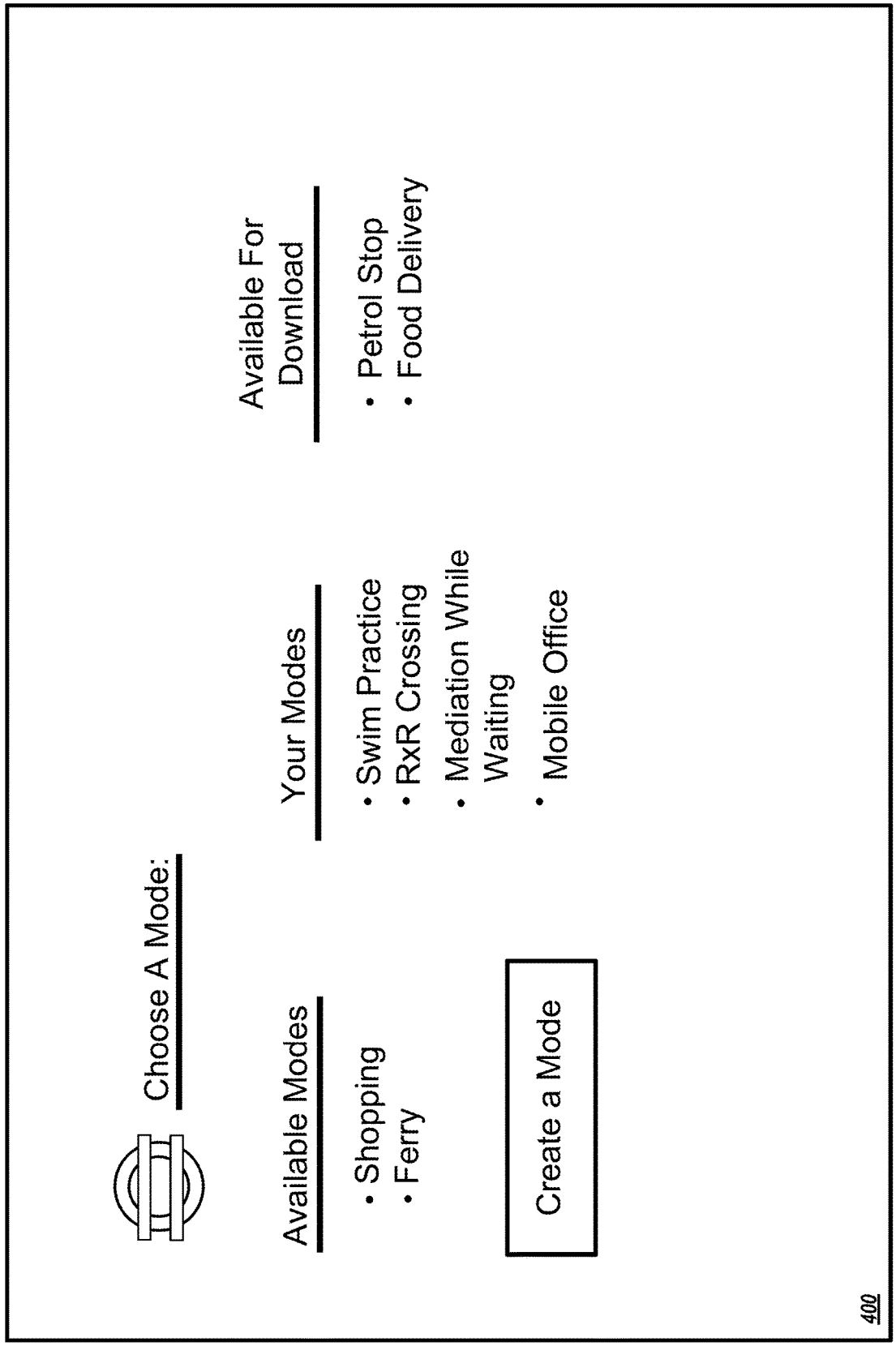
FIG. 4 illustrates an example user interface for selecting, creating, or downloading smart modes according to an embodiment hereof.

FIG. 4 is an example of a user interface for selecting, creating, or downloading smart modes 400. A driver can enter a smart mode even if a suggestion is not made by the vehicle. For example, if a driver were to park in front of a house, the system may not suggest to enter a smart mode based off of historical data or sensor input. However, if the driver desires to enter a smart mode, the driver can manually activate it.

Through a user interface in a vehicle, mobile device, computer, or otherwise, a driver can enter, exit, create, or delete a smart mode. Multiple smart modes can be available in a particular vehicle to a particular driver. Smart modes can be available to download from a networked location. For instance, a driver can download a smart mode designed for petrol stops rather than create one of their own. The driver can then adjust certain settings for a downloaded waiting period in order to make it more suitable for a particular driver.

Certain businesses can sponsor or create smart modes that can be available for download. A particular business can develop a smart mode that can use particular details about a given place in order to better interface the smart mode to the business. For example, when a vehicle arrives at a business for a pick-up order, the smart mode can be designed to recognize the parking spot (e.g., via visual processing of camera images or QR codes or near ranging location sensors), contact the business, identify to the business which parking spot the vehicle is in, and adjust other settings in the vehicle for the comfort of the driver. The vehicle can then update a timer on a display showing that the business has acknowledged the arrival of the vehicle and sent an estimated time to arrival of goods.

In some implementations, the smart mode focus is the ambiance of the vehicle. For instance, the driver can desire to meditate prior to returning to work after lunch. A "Meditation" smart mode can set therapeutic temperatures, play relaxing music, recline the seat, or more. If properly equipped, the smart mode can utilize methods of aromatherapy to help relax the driver.

For example, a smart mode labeled "Mobile Office" can create the physical space to work by moving the seats back and retracting the steering wheel. The smart mode can silence mobile devices, set the air conditioning, establish a timer based off a next event in a schedule, the time until the battery or fuel runs out, or any combination thereof.

A user can exit a smart mode at any time by several methods. A driver can select "Exit" on the user interface, a driver can shift a vehicle out of park, a smart mode can have a timer associated with it, or more.

A smart mode can shut the vehicle off and exit a smart mode for safety reasons. For instance, a vehicle can monitor the buildup of toxic gasses and determine the gas levels are too high for the occupants of the vehicle. The smart mode can then display the reason that the engine was shut off and the smart mode exited, thus ensuring the occupants are informed of a dangerous situation.

Figure 5:
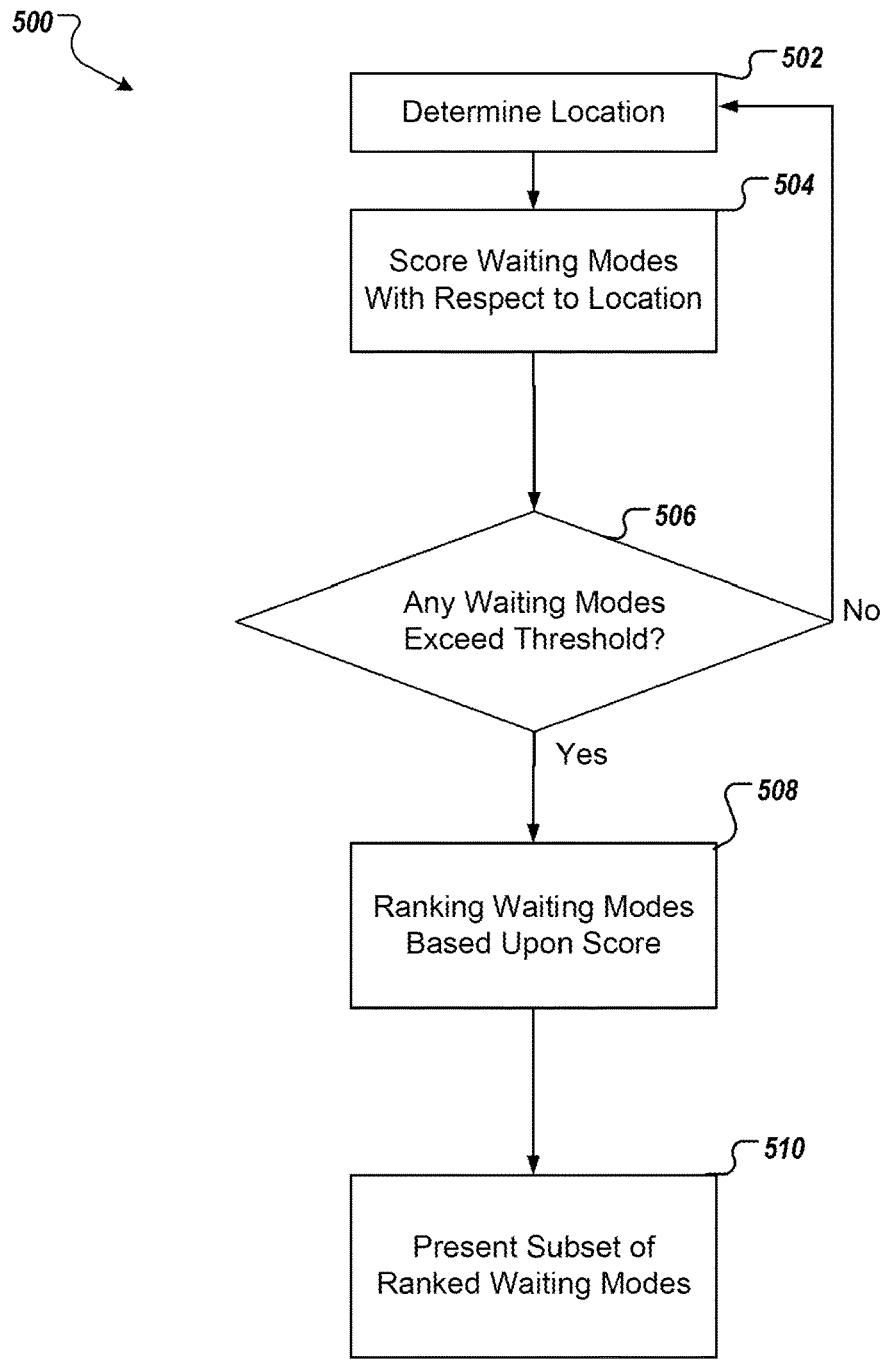
FIG. 5 illustrates an flow diagram of an example method according to an embodiment hereof.

FIG. 5 is an example system flow diagram. System 500 depicts the iterative loop the vehicle performs to determine the location of the vehicle, whether to suggest smart modes, and in what ranked order to suggest the smart modes.

The vehicle first determines a location 502. The vehicle determines location through various sensors including GPS, cellular positioning systems, WiFi, Bluetooth, cameras, sensors or emitters at a physical location, or any combination thereof. Devices connected to the vehicle can provide location data to the vehicle. The location could be a present location of a vehicle, or a future location of the vehicle as predicted, for example, by travel patterns that are discerned for a driver, by a driver inputting a route into a navigation system, or by accessing a meeting calendar that a driver has explicitly shared with the vehicle for this purpose.

The vehicle will score the smart modes with respect to location 504. As the vehicle drives about, the location is continuously feed into the system. The probability of each smart mode being needed is continuously computed based on the location of the vehicle. As the vehicle transits about, the rankings change. Inputs to the ranking can include the inputted location to the navigation system of the vehicle or the driver's electronic device connected to the vehicle. A score can be a probability of a smart mode being needed/ desired, expressed as a value, grade, relative value, level, percentage, etc. The score can be determined based on the vehicle's proximity to the location. In an example, the score can increase as the vehicle gets closer to a location associated with a smart mode. The proximity of the vehicle to such a location can be measured based on matching GPS signals to a map data reference, localization techniques, etc.

By way of example, the vehicle can travel to a ferry station. While in route to the ferry station the vehicle may stop at a gas station before reaching the ferry station. A score associated with the gas station can be higher while the vehicle is stopped at the gas station. A ranking can rank a smart mode associated with the gas station higher than that of a "ferry mode". A score associated with the gas station can be reduced as the vehicle travels away from the gas station and towards the ferry station. A score associated with a "ferry mode" can be increased as the vehicle approaches the ferry station. The ranking can, thus, change such that the "ferry mode" is ranked higher than a smart mode associated with the gas station.

The smart modes are iteratively checked to see if any smart modes exceed a threshold 506. The threshold determines a likelihood that the vehicle is in a position, typically parked, in which a smart mode would likely be desired. The threshold can be a value, relative value, grade, level, percentage, etc. that indicates it is more likely than not that a smart mode is needed/desired (e.g., a threshold of 51 on a 100 point scale). If the score of a smart mode likely being desired exceeds this threshold, the vehicle proceeds to suggest smart modes to the driver. If the score of a smart mode likely being desired does not exceed this threshold, the system continues to monitor location with respect to smart modes. In some implementations, the smart mode is suggested to the driver after the driver requests the activation of a smart mode, e.g., by way of a speech input such as the spoken phrases "Activate a smart mode" or "Show me the available smart modes," or by way of a manual user input, e.g., by way of a touch of a physical button or virtual control.

In some examples, the smart modes that exceed a threshold will be ranked based upon a score 508. Based on the location of the vehicle, different smart modes can be suggested to the driver. The smart modes will be ranked in the order of most likely to least likely. The last smart mode suggestion can be to "Add a New Mode" which allows the driver to create a new smart mode for the current situation. In other alternative examples, smart modes are not ranked, but rather all available smart modes, or an unranked subset of the smart modes, or a last used smart mode, or a default smart mode, or a first available smart mode are selected for display.

The vehicle can present a subset of the ranked smart modes 510. The ranked smart modes can be displayed to the user on a display screen in the center of the dashboard of the vehicle and selected with a touch screen input. The ranked smart modes can be displayed on the dashboard screen and selected with steering wheel inputs.

Figure 6:
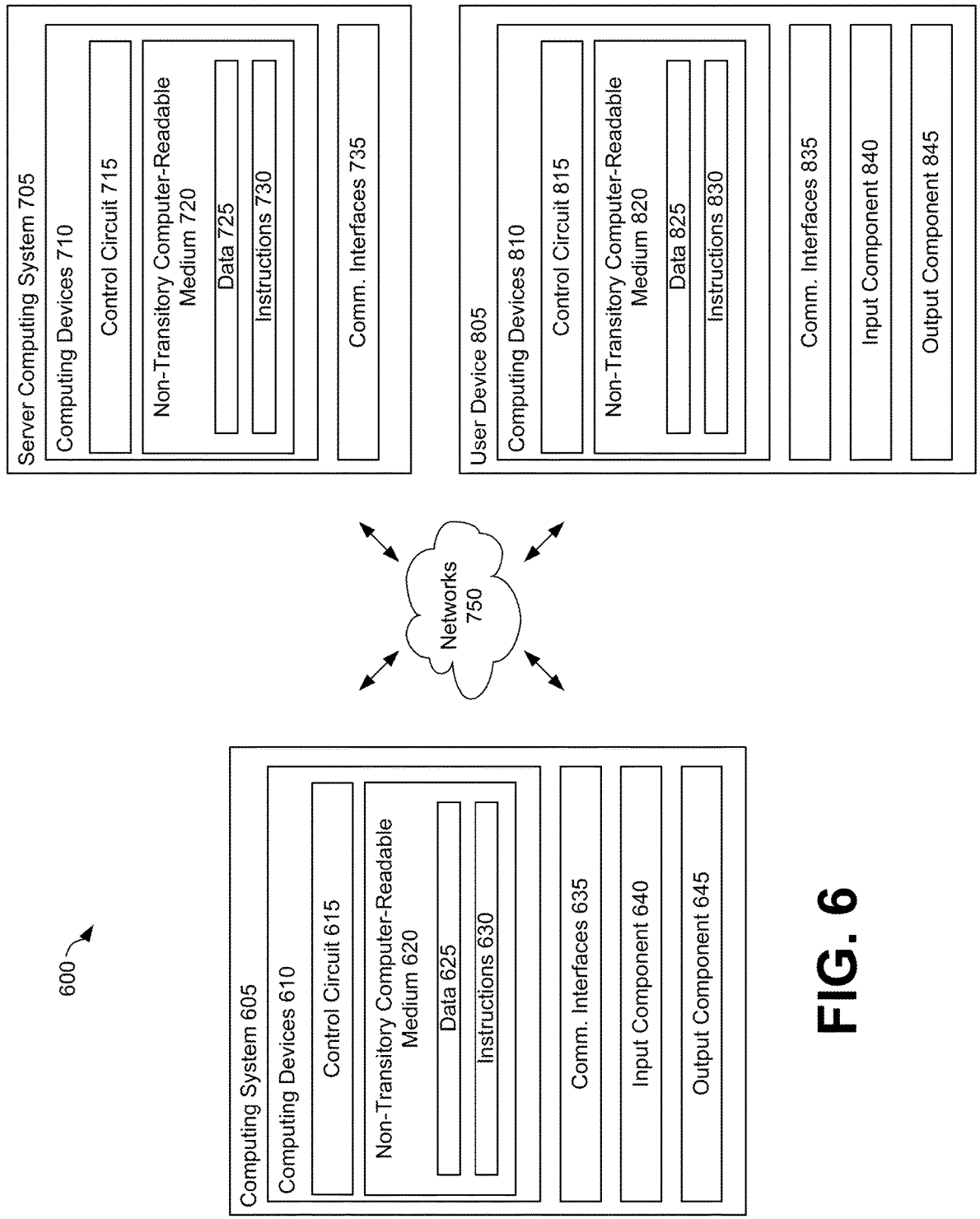
FIG. 6 illustrates a block diagram of computing systems according to an embodiment hereof.

FIG. 6 illustrates a block diagram of an example computing system 600 according to an embodiment hereof. The system 600 includes a computing system 605 (e.g., a computing system onboard a vehicle), a server computing system 705 (e.g., a remote computing system, cloud computing platform), and a user device 805 that are communicatively coupled over one or more networks 750.

The computing system 605 may include one or more computing devices 610 or circuitry. For instance, the computing system 605 may include a control circuit 615 and a non-transitory computer-readable medium 620, also referred to herein as memory. In an embodiment, the control circuit 615 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 615 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 615 may be programmed by one or more computer-readable or computer-executable instructions stored on the non-transitory computer-readable medium 620.

In an embodiment, the non-transitory computer-readable medium 620 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 620 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 620 may store information that may be accessed by the control circuit 615. For instance, the non-transitory computer-readable medium 620 (e.g., memory devices) may store data 625 that may be obtained, received, accessed, written, manipulated, created, and/or stored. The data 625 may include, for instance, any of the data or information described herein. In some implementations, the computing system 605 may obtain data from one or more memories that are remote from the computing system 605.

The non-transitory computer-readable medium 620 may also store computer-readable instructions 630 that may be executed by the control circuit 615. The instructions 630 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 615 to perform one or more functional tasks. The modules and computer-readable/executable instructions may be described as performing various operations or tasks when the control circuit 615 or other hardware component is executing the modules or computer-readable instructions.

The instructions 630 may be executed in logically and/or virtually separate threads on the control circuit 615. For example, the non-transitory computer-readable medium 620 may store instructions 630 that when executed by the control circuit 615 cause the control circuit 615 to perform any of the operations, methods and/or processes described herein. In some cases, the non-transitory computer-readable medium 620 may store computer-executable instructions or computer-readable instructions, such as instructions to perform at least a portion of the method of FIG. 5.

The computing system 605 may include one or more communication interfaces 635. The communication interfaces 635 may be used to communicate with one or more other systems. The communication interfaces 635 may include any circuits, components, software, etc. for communicating via one or more networks (e.g., networks 750). In some implementations, the communication interfaces 635 may include for example, one or more of a communications controller, receiver, transceiver, transmitter, port, conductors, software and/or hardware for communicating data/information.

The computing system 605 may also include one or more user input components 640 that receives user input. For example, the user input component 640 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 605 may include one or more output components 645. The output components 645 may include hardware and/or software for audibly or visually producing content. For instance, the output components 645 may include one or more speakers, earpieces, headsets, handsets, etc. The output components 645 may include a display device, which may include hardware for displaying a user interface and/or messages for a user. By way of example, the output component 645 may include a display screen, CRT, LCD, plasma screen, touch screen, TV, projector, tablet, and/or other suitable display components.

The server computing system 705 may include one or more computing devices 710. In an embodiment, the server computing system 705 may include or is otherwise implemented by one or more server computing devices. In instances in which the server computing system 705 includes plural server computing devices, such server computing devices may operate according to sequential computing architectures, parallel computing architectures, or some combination thereof.

The server computing system 705 may include a control circuit 715 and a non-transitory computer-readable medium 720, also referred to herein as memory 720. In an embodiment, the control circuit 715 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 715 may be programmed by one or more computer-readable or computer-executable instructions stored on the non-transitory computer-readable medium 720.

In an embodiment, the non-transitory computer-readable medium 720 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 720 may store information that may be accessed by the control circuit 715. For instance, the non-transitory computer-readable medium 720 (e.g., memory devices) may store data 725 that may be obtained, received, accessed, written, manipulated, created, and/or stored. The data 725 may include, for instance, any of the data or information described herein. In some implementations, the server system 705 may obtain data from one or more memories that are remote from the server system 705.

The non-transitory computer-readable medium 720 may also store computer-readable instructions 730 that may be executed by the control circuit 715. The instructions 730 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 715 to perform one or more functional tasks. The modules and computer-readable/executable instructions may be described as performing various operations or tasks when the control circuit 715 or other hardware component is executing the modules or computer-readable instructions.

The instructions 730 may be executed in logically and/or virtually separate threads on the control circuit 715. For example, the non-transitory computer-readable medium 720 may store instructions 730 that when executed by the control circuit 715 cause the control circuit 715 to perform any of the operations, methods and/or processes described herein. In some cases, the non-transitory computer-readable medium 720 may store computer-executable instructions or computer-readable instructions, such as instructions to perform at least a portion of the method of FIG. 5.

The server computing system 705 may include one or more communication interfaces 735. The communication interfaces 735 may be used to communicate with one or more other systems. The communication interfaces 735 may include any circuits, components, software, etc. for communicating via one or more networks (e.g., networks 750). In some implementations, the communication interfaces 735 may include for example, one or more of a communications controller, receiver, transceiver, transmitter, port, conductors, software and/or hardware for communicating data/information.

The computing system 605 and/or the server computing system 705 may also be in communication with a user device 805 that is communicatively coupled over the networks 750.

The user device 805 may include one or more computing devices 810. The user device 805 may include a control circuit 815 and a non-transitory computer-readable medium 820, also referred to herein as memory 820. In an embodiment, the control circuit 815 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 815 may be programmed by one or more computer-readable or computer-executable instructions stored on the non-transitory computer-readable medium 820.

In an embodiment, the non-transitory computer-readable medium 820 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 820 may store information that may be accessed by the control circuit 815. For instance, the non-transitory computer-readable medium 820 (e.g., memory devices) may store data 825 that may be obtained, received, accessed, written, manipulated, created, and/or stored. The data 825 may include, for instance, any of the data or information described herein. In some implementations, the user device 805 may obtain data from one or more memories that are remote from the user device 805.

The non-transitory computer-readable medium 820 may also store computer-readable instructions 830 that may be executed by the control circuit 815. The instructions 830 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 815 to perform one or more functional tasks. The modules and computer-readable/executable instructions may be described as performing various operations or tasks when the control circuit 815 or other hardware component is executing the modules or computer-readable instructions.

The instructions 830 may be executed in logically or virtually separate threads on the control circuit 815. For example, the non-transitory computer-readable medium 820 may store instructions 830 that when executed by the control circuit 815 cause the control circuit 815 to perform any of the operations, methods and/or processes described herein. In some cases, the non-transitory computer-readable medium 820 may store computer-executable instructions or computer-readable instructions, such as instructions to perform at least a portion of the method of FIG. 5.

The user device 805 may include one or more communication interfaces 835. The communication interfaces 835 may be used to communicate with one or more other systems. The communication interfaces 835 may include any circuits, components, software, etc. for communicating via one or more networks (e.g., networks 750). In some implementations, the communication interfaces 835 may include for example, one or more of a communications controller, receiver, transceiver, transmitter, port, conductors, software and/or hardware for communicating data/information.

The user device 805 may also include one or more user input components 840 that receives user input. For example, the user input component 840 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The user device 805 may include one or more output components 845. The output components 845 may include hardware and/or software for audibly or visually producing content. For instance, the output components 845 may include one or more speakers, earpieces, headsets, handsets, etc. The output components 845 may include a display device, which may include hardware for displaying a user interface and/or messages for a user. By way of example, the output component 845 may include a display screen, CRT, LCD, plasma screen, touch screen, TV, projector, tablet, and/or other suitable display components.

The one or more networks 750 may be any type of communications network, such as a local area network (e.g., intranet), wide area network (e.g., Internet), or some combination thereof and may include any number of wired or wireless links. In general, communication over a network 750 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Additional Discussion of Various Embodiments

Embodiment 1 relates to a computer-implemented method. The computer-implemented method includes determining a context of a vehicle wherein the context identifies an environment the vehicle is in. The method includes selecting a particular smart mode from among multiple smart modes that are associated with the vehicle, the particular smart mode being associated with deactivation or moderation of one or more vehicle components that draw battery power or that contribute to greenhouse gas emissions. The method includes transmitting a message to deactivate or moderate the one or more vehicle components of the vehicle according to the selected, particular smart mode.

Embodiment 2 includes the method of Embodiment 1. In this embodiment, transmitting a message to moderate the one or more vehicle components includes transmitting a message to the one or more vehicle components to remain activated but to operate at a lower setting that reduces drawn battery power or greenhouse gas emissions.

Embodiment 3 includes the method of any of Embodiments 1-2. In this embodiment, determining the context to the vehicle includes determining that the vehicle is currently transiting on a ferry, selecting the particular smart mode includes selecting a ferry mode, and transmitting the message includes transmitting the message to automatically apply a parking brake, turn off passenger compartment lights, and disable a vehicle tow away alarm.

Embodiment 4 includes the method of any of Embodiments 1-3. In this embodiment, the method further includes determining an updated context of the vehicle; selecting a different smart mode from among the multiple smart modes that are associated with the vehicle; prompting an occupant of the vehicle to confirm a change of smart driving modes; and after the occupant of the vehicle confirms the change of smart driving modes, transmitting a message to deactivate or moderate the one or more vehicle components of the vehicle according to the different smart mode.

Embodiment 5 includes the method of any of Embodiments 1-4. In this embodiment, the method further includes ranking the multiple smart modes according to respective scores for each smart mode that are generated based on the context of the vehicle, wherein the particular smart mode is selected as a highest ranked of the multiple smart modes.

Embodiment 6 includes the method of any of Embodiments 1-5. In this embodiment, the one or more vehicle components are deactivated or moderated according to one or more user configurable settings that are associated with the particular smart mode.

Embodiment 7 includes the method of any of Embodiments 1-6. In this embodiment, the particular smart mode is a smart mode that was previously created for the context of the vehicle by a prior occupant of the vehicle.

Embodiment 8 relates to a non-transitory computer-readable storage medium storing instructions that when executed by one or more computers cause the one or more computers to perform operations. The operations include determining a context of a vehicle wherein the context identifies an environment the vehicle is in. The operations include selecting a particular smart mode from among multiple smart modes that are associated with the vehicle, the particular smart mode being associated with deactivation or moderation of one or more vehicle components that draw battery power or that contribute to greenhouse gas emissions. The operations include transmitting a message to deactivate or moderate the one or more vehicle components of the vehicle according to the selected, particular smart mode.

Embodiment 9 includes the non-transitory computer-readable storage medium of Embodiment 8. In this embodiment, transmitting a message to moderate the one or more vehicle components includes transmitting a message to the one or more vehicle components to remain activated but to operate at a lower setting that reduces drawn battery power or greenhouse gas emissions.

Embodiment 10 includes the non-transitory computer-readable storage medium of any of Embodiments 8-9. In this embodiment, determining the context to the vehicle includes determining that the vehicle is currently transiting on a ferry, selecting the particular smart mode includes selecting a ferry mode, and transmitting the message includes transmitting the message to automatically apply a parking brake, turn off passenger compartment lights, and disable a vehicle tow away alarm.

Embodiment 11 includes the non-transitory computer-readable storage medium of any of Embodiments 8-10. In this embodiment, the operations further include determining an updated context of the vehicle; selecting a different smart mode from among the multiple smart modes that are associated with the vehicle; prompting an occupant of the vehicle to confirm a change of smart driving modes; and after the occupant of the vehicle confirms the change of smart driving modes, transmitting a message to deactivate or moderate the one or more vehicle components of the vehicle according to the different smart mode.

Embodiment 12 includes the non-transitory computer-readable storage medium of any of Embodiments 8-11. In this embodiment, the operations further include ranking the multiple smart modes according to respective scores for each smart mode that are generated based on the context of the vehicle, wherein the particular smart mode is selected as a highest ranked of the multiple smart modes.

Embodiment 13 includes the non-transitory computer-readable storage medium of any of Embodiments 8-12. In this embodiment, the one or more vehicle components are deactivated or moderated according to one or more user configurable settings that are associated with the particular smart mode.

Embodiment 14 includes the non-transitory computer-readable storage medium of any of Embodiments 8-13. In this embodiment, the particular smart mode is a smart mode that was previously created for the context of the vehicle by a prior occupant of the vehicle.

Embodiment 15 relates to a system. The system includes one or more processors and a computer-readable storage device coupled to the one or more processors and having instructions stored thereon which, when executed by the one or more processors, cause the one or more processors to perform operations. The operations include determining a context of a vehicle wherein the context identifies an environment the vehicle is in. The operations include selecting a particular smart mode from among multiple smart modes that are associated with the vehicle, the particular smart mode being associated with deactivation or moderation of one or more vehicle components that draw battery power or that contribute to greenhouse gas emissions. The operations include transmitting a message to deactivate or moderate the one or more vehicle components of the vehicle according to the selected, particular smart mode.

Embodiment 16 includes the system of Embodiment 15. In this embodiment, transmitting a message to moderate the one or more vehicle components includes transmitting a message to the one or more vehicle components to remain activated but to operate at a lower setting that reduces drawn battery power or greenhouse gas emissions.

Embodiment 17 includes the system of any of Embodiments 15-16. In this embodiment, determining the context to the vehicle includes determining that the vehicle is currently transiting on a ferry, selecting the particular smart mode includes selecting a ferry mode, and transmitting the message includes transmitting the message to automatically apply a parking brake, turn off passenger compartment lights, and disable a vehicle tow away alarm.

Embodiment 18 includes the system of any of Embodiments 15-17. In this embodiment, the operations further include determining an updated context of the vehicle; selecting a different smart mode from among the multiple smart modes that are associated with the vehicle; prompting an occupant of the vehicle to confirm a change of smart driving modes; and after the occupant of the vehicle confirms the change of smart driving modes, transmitting a message to deactivate or moderate the one or more vehicle components of the vehicle according to the different smart mode.

Embodiment 19 includes the system of any of Embodiments 15-18. In this embodiment, the operations further include ranking the multiple smart modes according to respective scores for each smart mode that are generated based on the context of the vehicle, wherein the particular smart mode is selected as a highest ranked of the multiple smart modes.

Embodiment 20 includes the system of any of Embodiments 15-19. In this embodiment, the one or more vehicle components are deactivated or moderated according to one or more user configurable settings that are associated with the particular smart mode.

Additional Disclosure

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine readable storage device, a machine readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, a "software engine," refers to a software implemented input/output system that provides an output that is different from the input. A software engine can be an encoded block of functionality, such as a library, a platform, a software development kit ("SDK"), or an object. Each software engine can be implemented on any appropriate type of computing device, e.g., servers, mobile phones, tablet computers, notebook computers, music players, e book readers, laptop or desktop computers, PDAs, smart phones, or other stationary or portable devices, which includes one or more processors and computer readable media. Additionally, two or more of the software engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the subject matter has been described in detail with respect to various specific example embodiments thereof, each example is provided by way of explanation, not limitation of the disclosure. Examples described without "can" or "may" are provided by way of explanation, not limitation to the disclosure unless indicated in the claims. Those skilled in the art, upon attaining an understanding of the foregoing, may readily produce alterations to, variations of, and equivalents to such embodiments. Accordingly, the subject disclosure does not preclude inclusion of such modifications, variations and/or additions to the subject matter as would be readily apparent to one of ordinary skill in the art. For instance, features illustrated or described as part of one embodiment may be used with another embodiment to yield a still further embodiment. Thus, it is intended that the disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the disclosure is by way of example rather than by way of limitation, and the subject disclosure does not preclude inclusion of such modifications, variations or additions to the subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

The invention claimed is:

1. A computer-implemented method comprising:
   determining a context of a vehicle wherein the context identifies an environment the vehicle is in;
   in response to the context indicating the vehicle is or will be parked or not operating on an active roadway, selecting a particular smart mode from among multiple smart modes that are associated with the vehicle being parked or not operating on the active roadway, the particular smart mode being associated with deactivation or moderation of one or more vehicle components that draw battery power or that contribute to greenhouse gas emissions, the particular smart mode being selected from among the multiple smart modes based on a ranking, the ranking based on the context of the vehicle and the environment the vehicle is in; and
   deactivating or moderating the one or more vehicle components according to one or more user configurable settings that are associated with the particular smart mode when the vehicle is parked or not operating on the active roadway.

2. The method of claim 1, wherein deactivating or moderating the one or more vehicle components comprises transmitting a message indicating to the one or more vehicle components to remain activated but to operate at a lower setting that reduces drawn battery power or greenhouse gas emissions.

3. The method of claim 1, wherein:
   determining the context of the vehicle comprises determining that the vehicle is currently transiting on a ferry,
   selecting the particular smart mode comprises selecting a ferry mode, and
   wherein deactivating or moderating the one or more vehicle components comprises transmitting a message to automatically apply a parking brake, turn off passenger compartment lights, and disable a vehicle tow away alarm.

4. The method of claim 1, comprising:
   determining an updated context of the vehicle;
   selecting a different smart mode from among the multiple smart modes that are associated with the vehicle;
   prompting an occupant of the vehicle to confirm a change of smart driving modes; and
   after the occupant of the vehicle confirms the change of smart driving modes,
   deactivating or moderating the one or more vehicle components according to one or more user configurable settings that are associated with the different smart mode.

5. The method of claim 1, comprising:
   generating the ranking according to respective scores for each smart mode that are generated based on the context of the vehicle,
   wherein the particular smart mode is selected as a highest ranked of the multiple smart modes.

6. The method of claim 1, wherein the one or more vehicle components that are deactivated or moderated according to one or more user configurable settings that are associated with the particular smart mode are set to not exceed an emissions threshold.

7. The method of claim 1, further comprising updating the ranking based on a change in the environment of the vehicle.

8. A non-transitory computer-readable storage medium storing instructions that when executed by one or more computers cause the one or more computers to perform operations comprising:
   determining a context of a vehicle wherein the context identifies an environment the vehicle is in;
   in response to the context indicating the vehicle is or will be parked or not operating on an active roadway, selecting a particular smart mode from among multiple smart modes that are associated with the vehicle being parked or not operating on the active roadway, the particular smart mode being associated with deactivation or moderation of one or more vehicle components that draw battery power or that contribute to greenhouse gas emissions the particular smart mode being selected from among the multiple smart modes based on a ranking, the ranking based on the context of the vehicle and the environment the vehicle is in; and
   deactivating or moderating the one or more vehicle components according to one or more user configurable settings that are associated with the particular smart mode when the vehicle is parked or not operating on the active roadway.

9. The medium of claim 8, wherein deactivating or moderating the one or more vehicle components comprises transmitting a message indicating to the one or more vehicle components to remain activated but to operate at a lower setting that reduces drawn battery power or greenhouse gas emissions.

10. The medium of claim 8, wherein:
    determining the context of the vehicle comprises determining that the vehicle is currently transiting on a ferry,
    selecting the particular smart mode comprises selecting a ferry mode, and
    wherein deactivating or moderating the one or more vehicle components comprises transmitting a message to automatically apply a parking brake, turn off passenger compartment lights, and disable a vehicle tow away alarm.

11. The medium of claim 8, wherein the operations comprise:
    determining an updated context of the vehicle;
    selecting a different smart mode from among the multiple smart modes that are associated with the vehicle;
    prompting an occupant of the vehicle to confirm a change of smart driving modes; and
    after the occupant of the vehicle confirms the change of smart driving modes,
    deactivating or moderating the one or more vehicle components according to one or more user configurable settings that are associated with the different smart mode.

12. The medium of claim 8, wherein the operations comprise:
    generating the ranking according to respective scores for each smart mode that are generated based on the context of the vehicle,
    wherein the particular smart mode is selected as a highest ranked of the multiple smart modes.

13. The medium of claim 8, wherein the one or more vehicle components that are deactivated or moderated according to one or more user configurable settings that are associated with the particular smart mode are set to not exceed an emissions threshold.

14. The medium of claim 8, wherein the particular smart mode is a smart mode that was previously created for the context of the vehicle by a prior occupant of the vehicle.

15. A system comprising:
one or more processors; and
a computer-readable storage device coupled to the one or more processors and having instructions stored thereon which, when executed by the one or more processors, cause the one or more processors to perform operations comprising:
determining a context of a vehicle wherein the context identifies an environment the vehicle is in;
in response to the context indicating the vehicle is or will be parked or not operating on an active roadway, selecting a particular smart mode from among multiple smart modes that are associated with the vehicle being parked or not operating on an active roadway, the particular smart mode being associated with deactivation or moderation of one or more vehicle components that draw battery power or that contribute to greenhouse gas emissions, the particular smart mode being selected from among the multiple smart modes based on a ranking, the ranking based on the context of the vehicle and the environment the vehicle is in; and
deactivating or moderating the one or more vehicle components according to one or more user configurable settings that are associated with the particular smart mode when the vehicle is parked or not operating on the active roadway.

16. The system of claim 15, wherein deactivating or moderating the one or more vehicle components comprises transmitting a message indicating to the one or more vehicle components to remain activated but to operate at a lower setting that reduces drawn battery power or greenhouse gas emissions.

17. The system of claim 15, wherein:
determining the context of the vehicle comprises determining that the vehicle is currently transiting on a ferry,
selecting the particular smart mode comprises selecting a ferry mode, and
wherein deactivating or moderating the one or more vehicle components comprises transmitting a message to automatically apply a parking brake, turn off passenger compartment lights, and disable a vehicle tow away alarm.

18. The system of claim 15, wherein the operations comprise:
determining an updated context of the vehicle;
selecting a different smart mode from among the multiple smart modes that are associated with the vehicle;
prompting an occupant of the vehicle to confirm a change of smart driving modes; and
after the occupant of the vehicle confirms the change of smart driving modes,
deactivating or moderating the one or more vehicle components according to one or more user configurable settings that are associated with the different smart mode.

19. The system of claim 15, wherein the operations comprise:
generating the ranking according to respective scores for each smart mode that are generated based on the context of the vehicle,
wherein the particular smart mode is selected as a highest ranked of the multiple smart modes.

20. The system of claim 15, wherein the one or more vehicle components that are deactivated or moderated according to one or more user configurable settings that are associated with the particular smart mode are set to not exceed an emissions threshold.

* * * * *